(12) United States Patent
Odaohhara

(10) Patent No.: US 6,396,243 B2
(45) Date of Patent: May 28, 2002

(54) POWER UNIT AND POWER SOURCE SWITCHING APPARATUS FOR A COMPUTER

(75) Inventor: Shigefumi Odaohhara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/814,977

(22) Filed: Mar. 22, 2001

(30) Foreign Application Priority Data

Mar. 22, 2000 (JP) ........................................ 2000-080184

(51) Int. Cl.$^7$ ............................................. H01M 10/46
(52) U.S. Cl. ........................................ 320/116; 320/128
(58) Field of Search ................................. 320/116, 117, 320/121, 127, 128, 134, 136, 137, 138

(56) References Cited

U.S. PATENT DOCUMENTS

| 5,721,481 | A | * | 2/1998 | Narita et al. |
| 5,825,155 | A | * | 10/1998 | Ito et al. |
| 6,118,253 | A | * | 9/2000 | Mukainakano et al. |

\* cited by examiner

*Primary Examiner*—Edward H. Tso
(74) *Attorney, Agent, or Firm*—John B. Schelkopf

(57) ABSTRACT

In a removable power supply unit for a computer, a power source switching FET provided in a protective circuit of a main battery and a second battery is enabled in response to a signal from the computer to switch power paths from each of the main battery and the second battery to a DC-DC converter of the computer, thereby reducing the number of such power source switching FETs provided in an internal circuit of the computer.

12 Claims, 11 Drawing Sheets

[Figure 1]
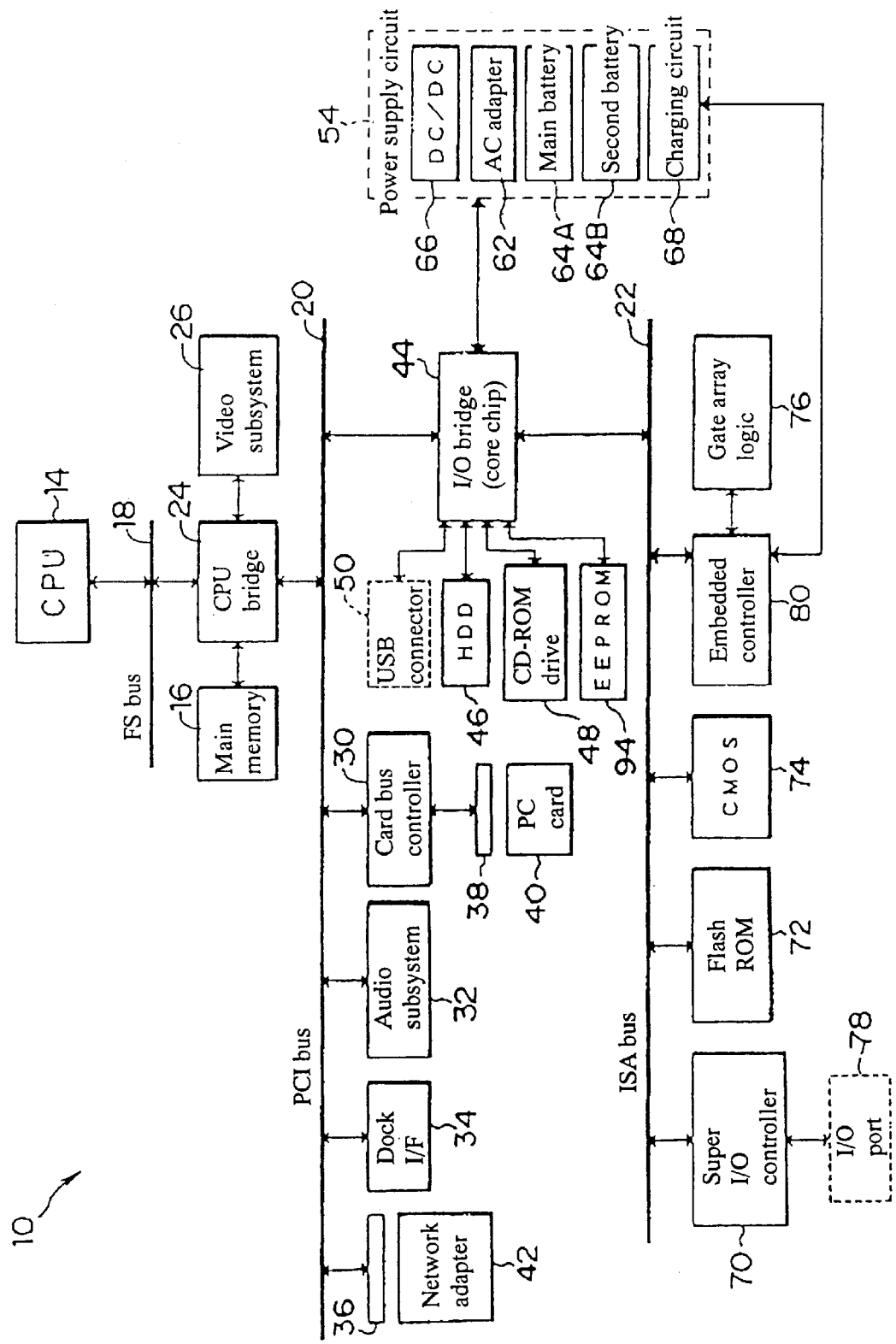

[Figure 2]
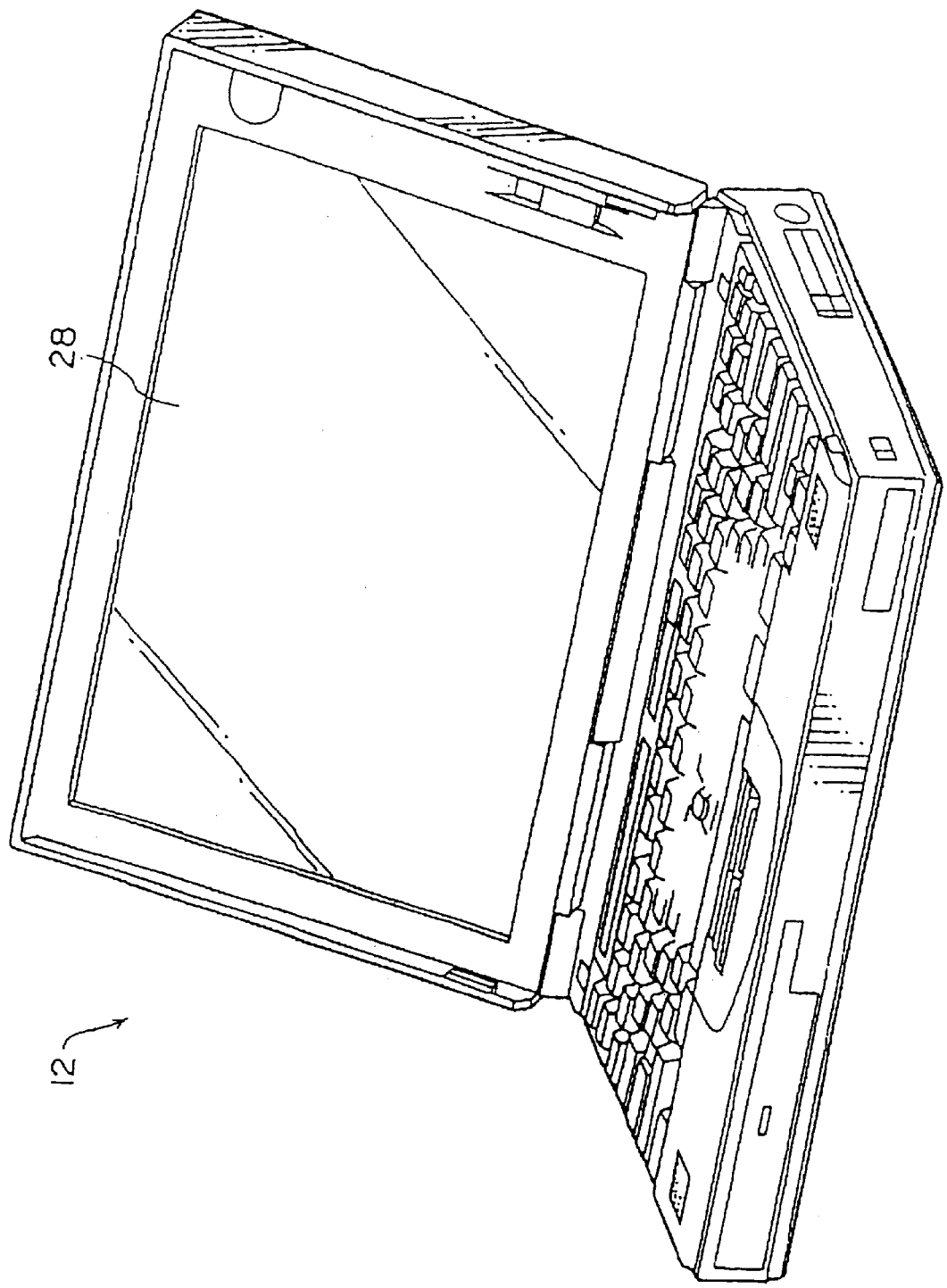

[Figure 3]
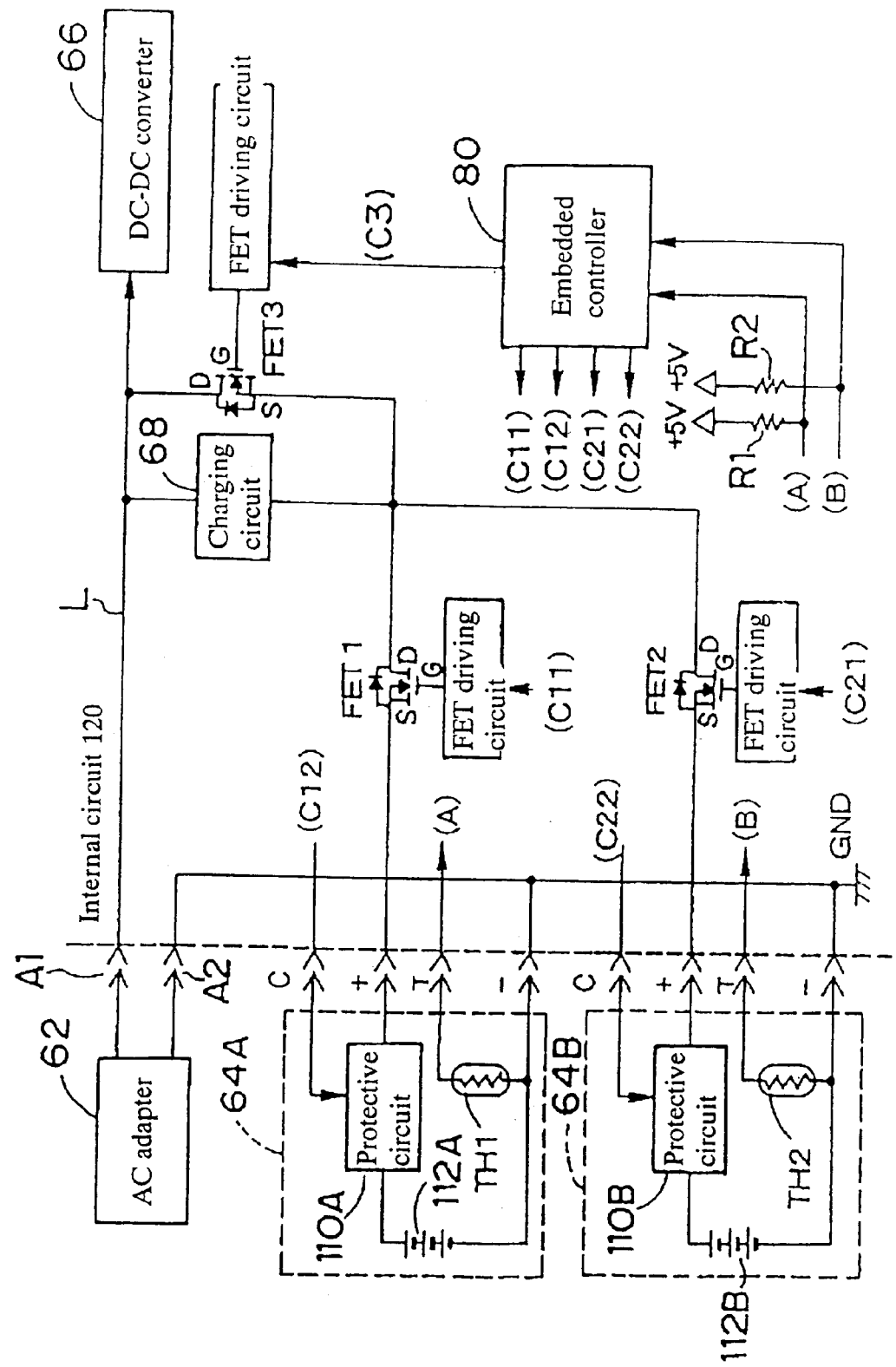

[Figure 4]
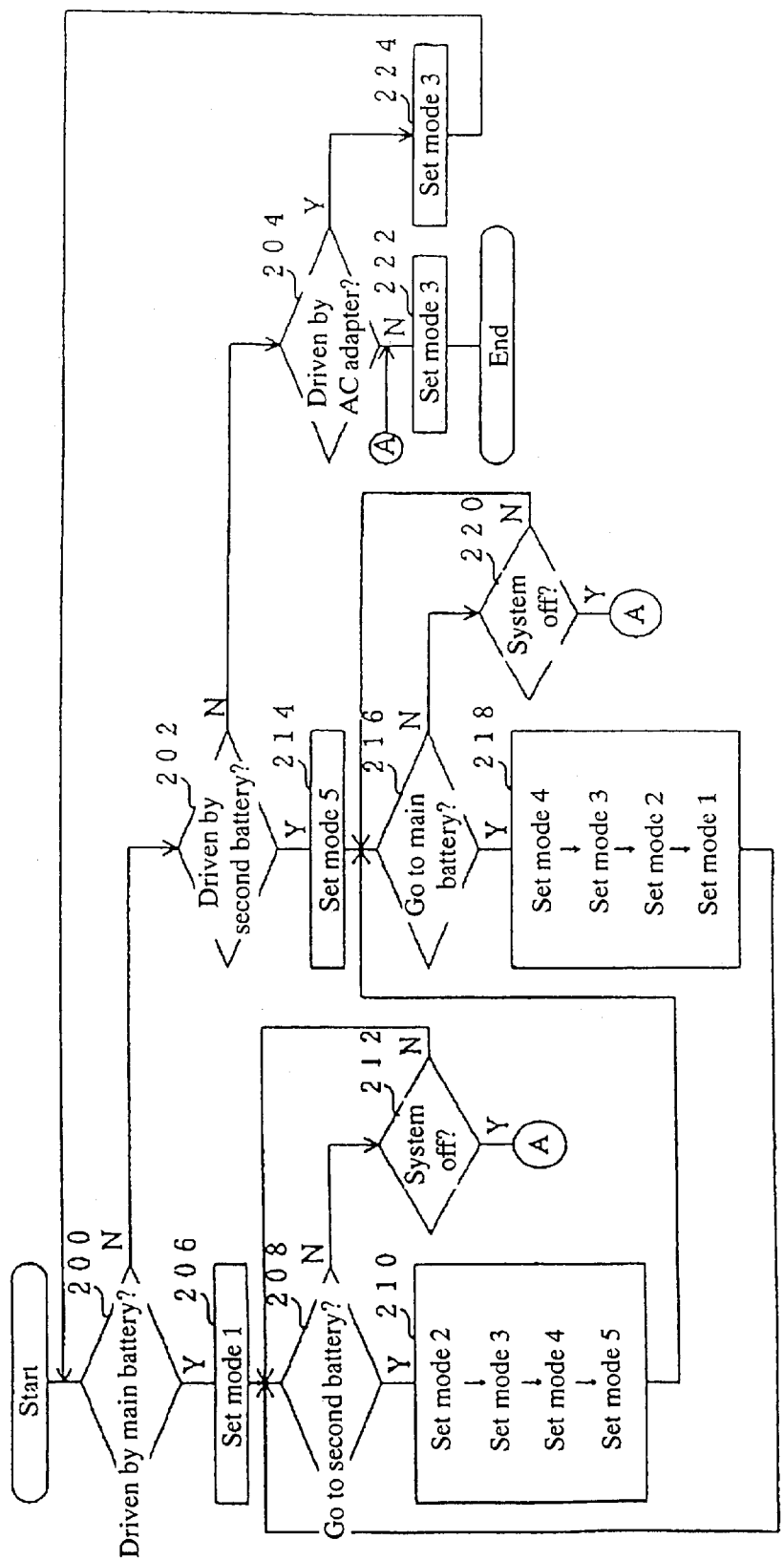

[Figure 5]
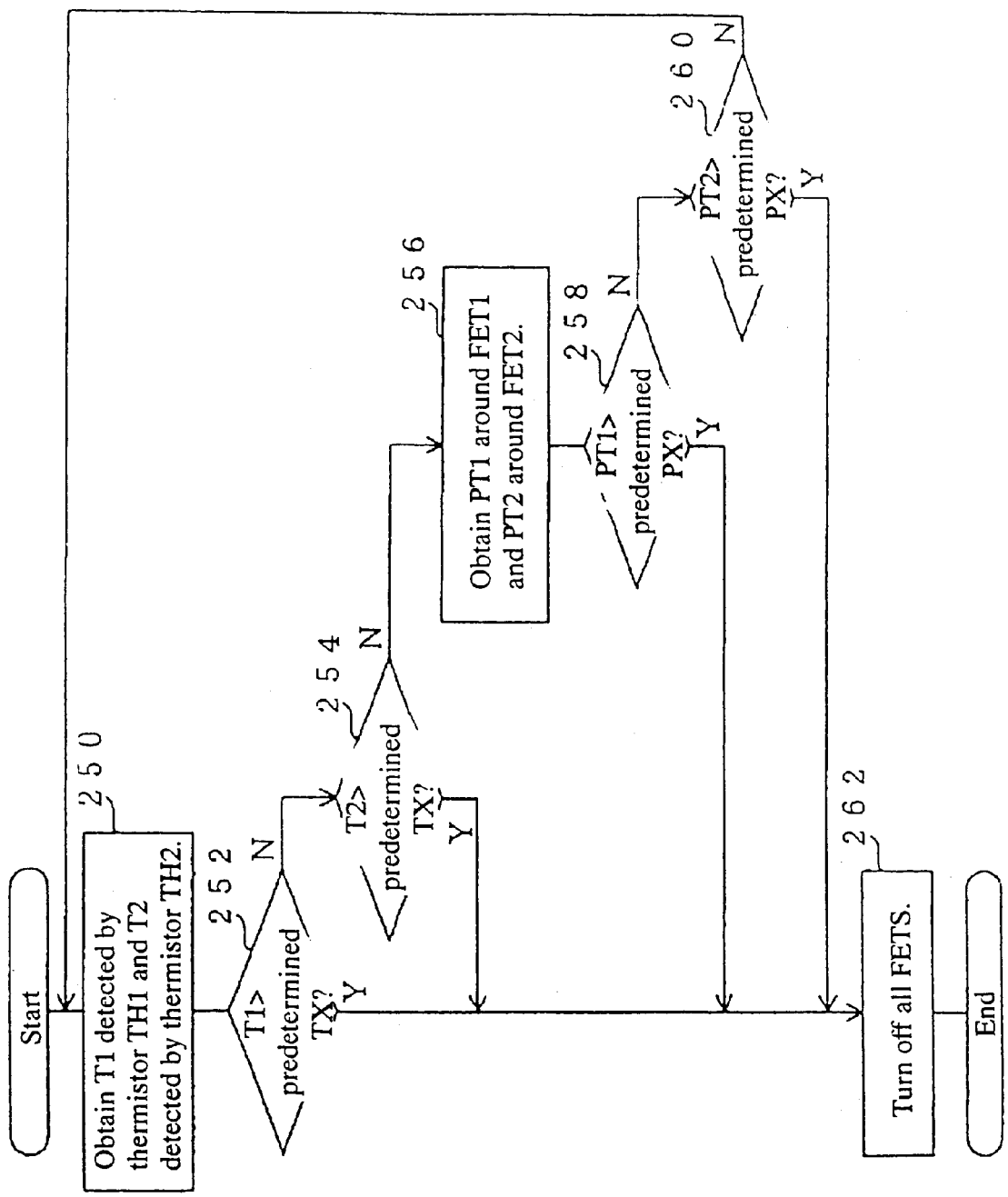

[Figure 6]
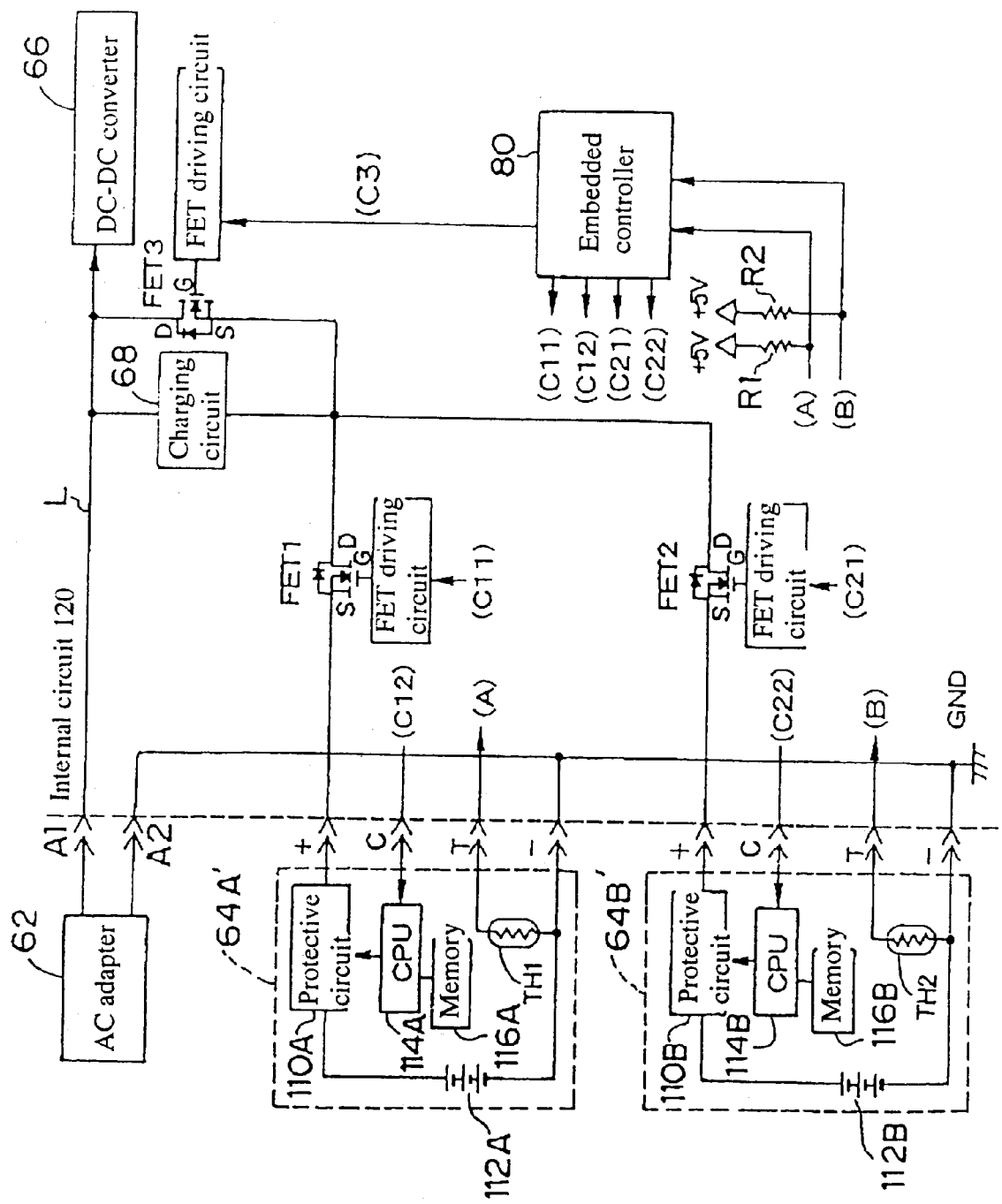

[Figure 7]
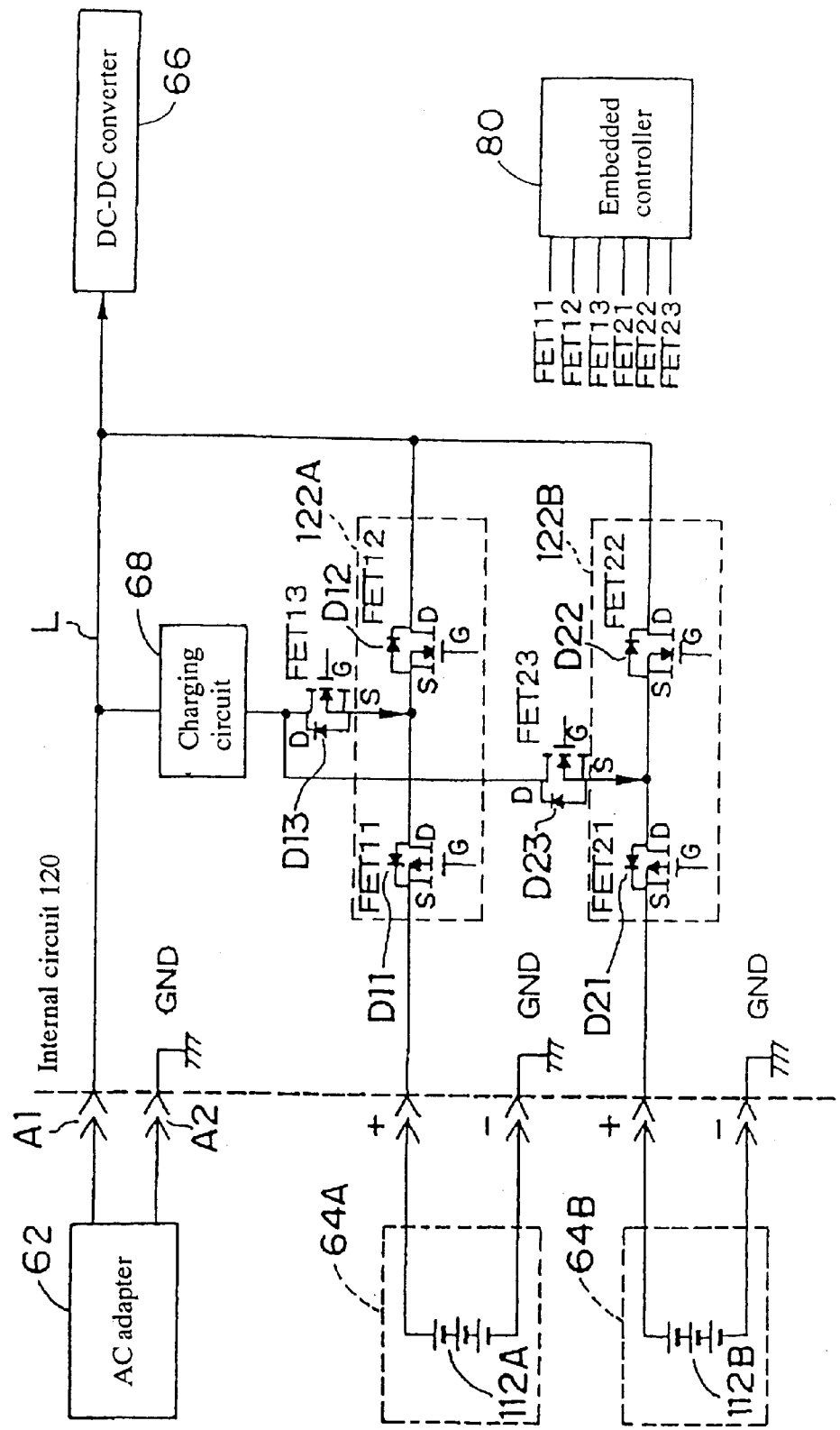

[Figure 8]
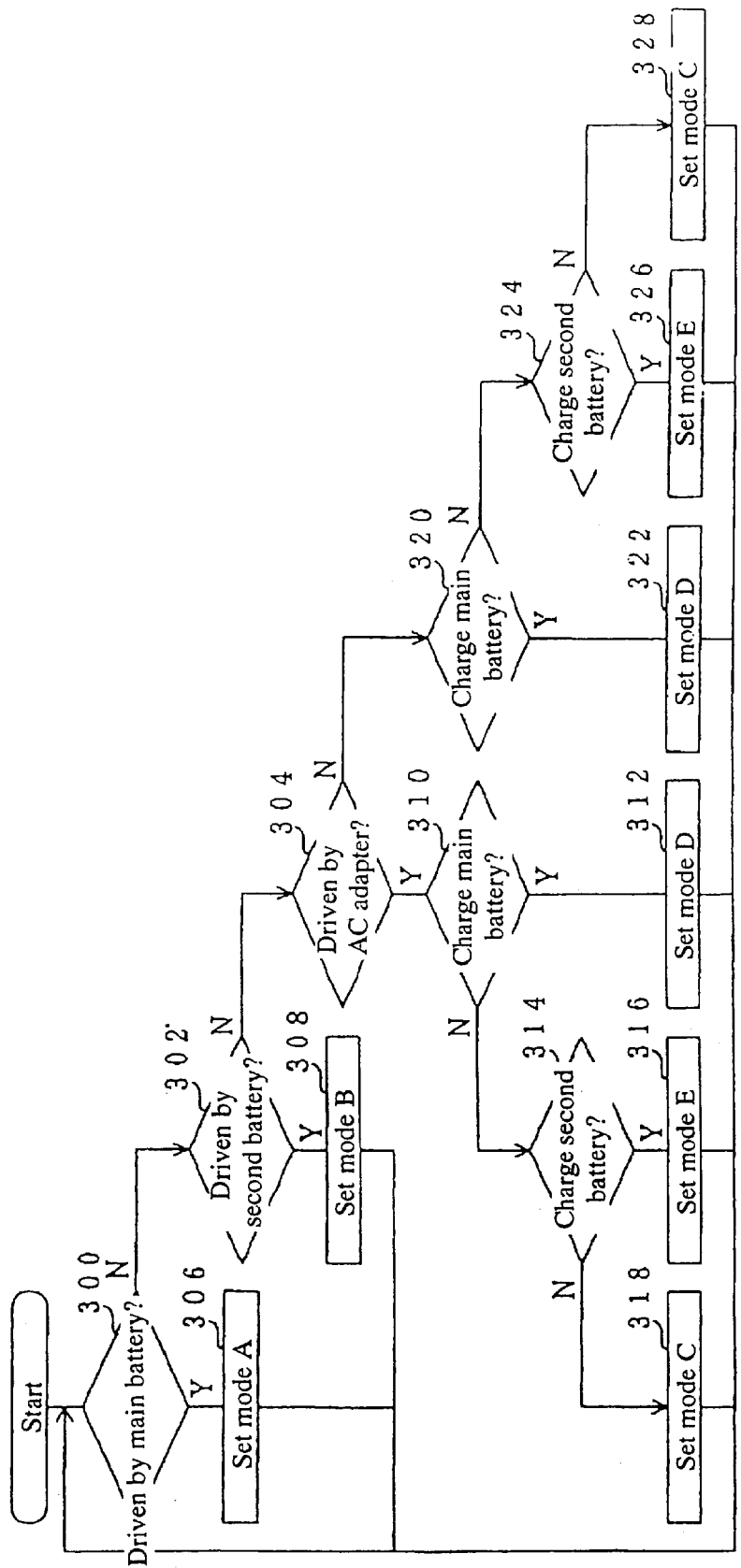

[Figure 9]
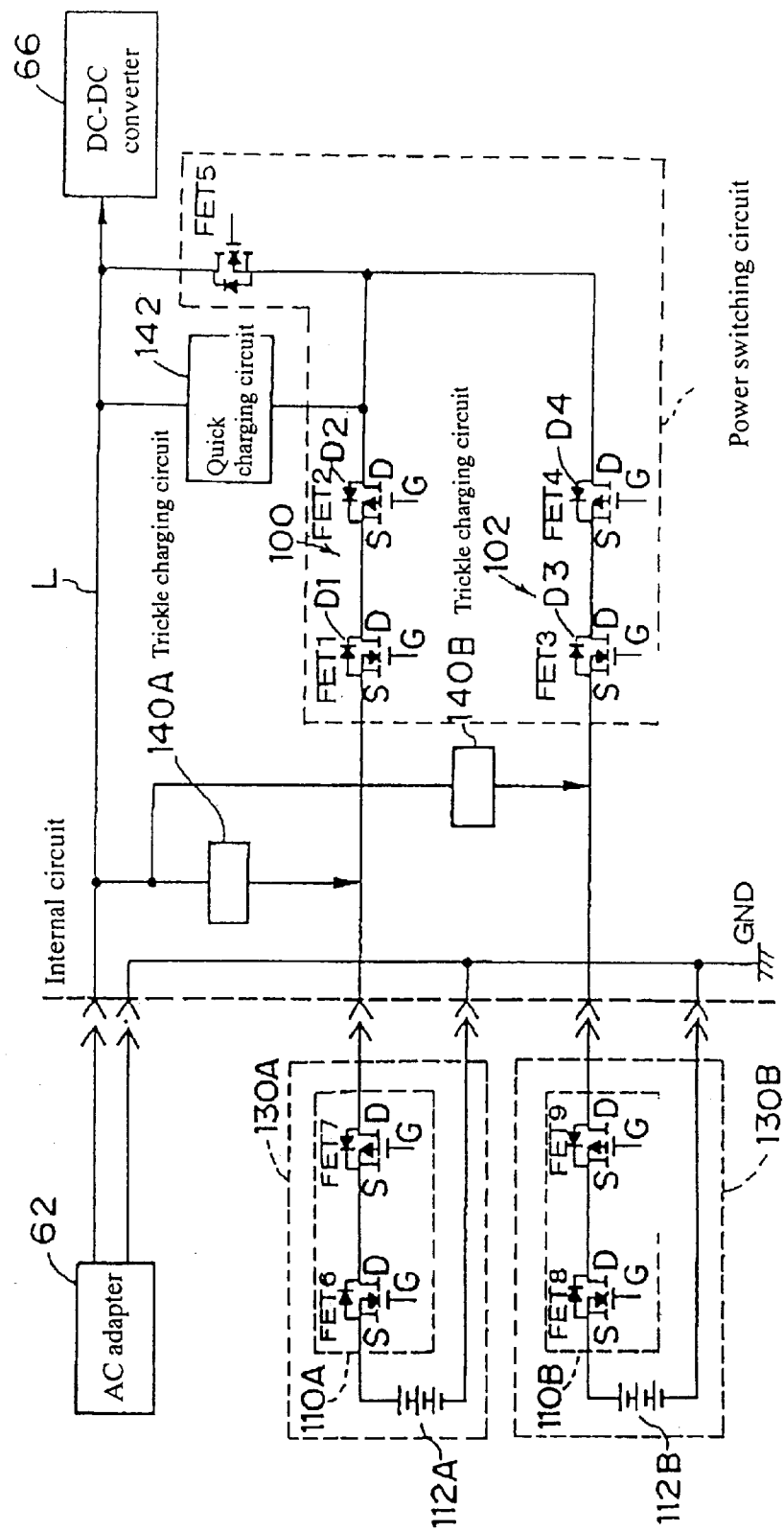

[Figure 10]
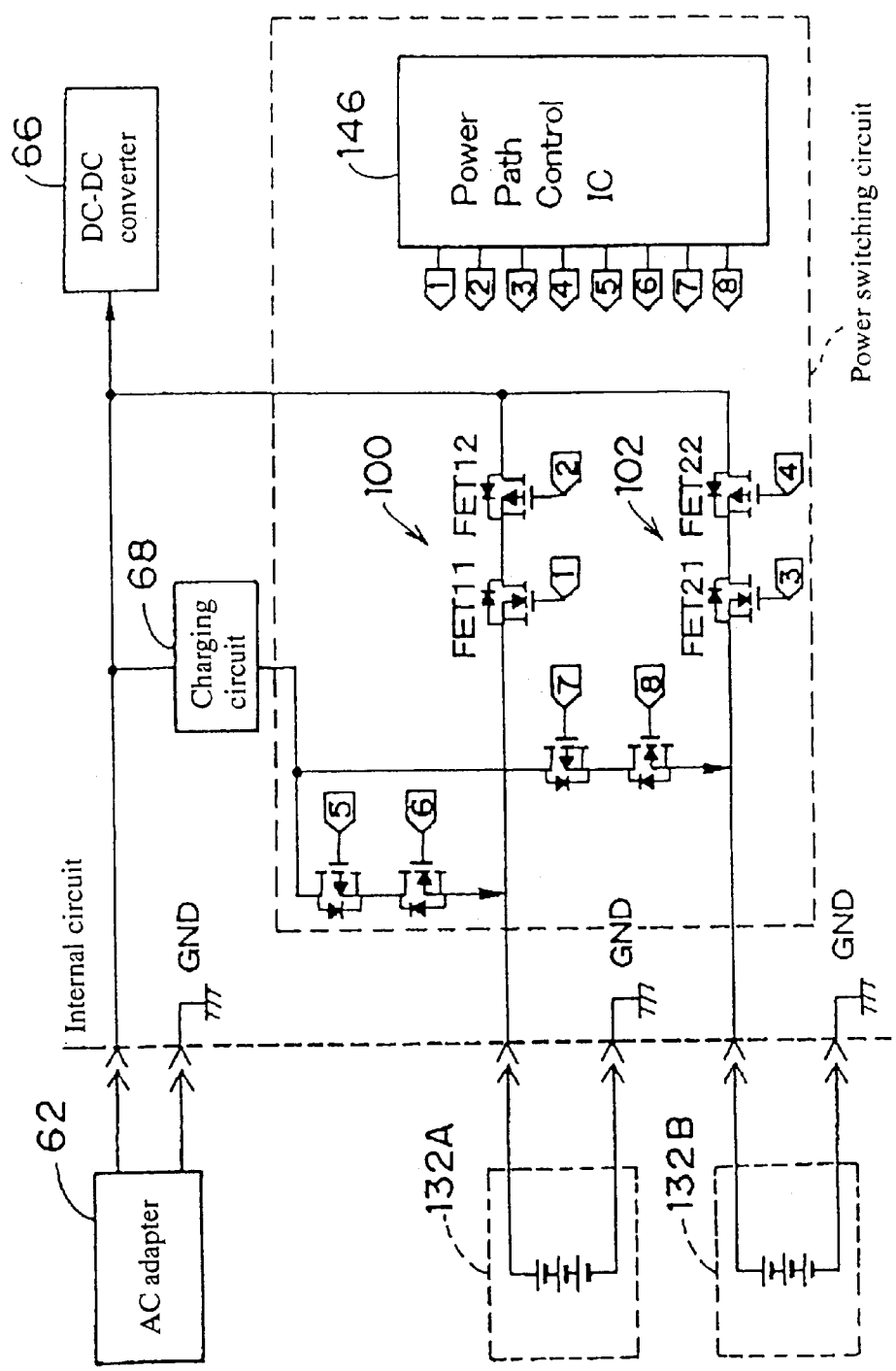

[Figure 11]
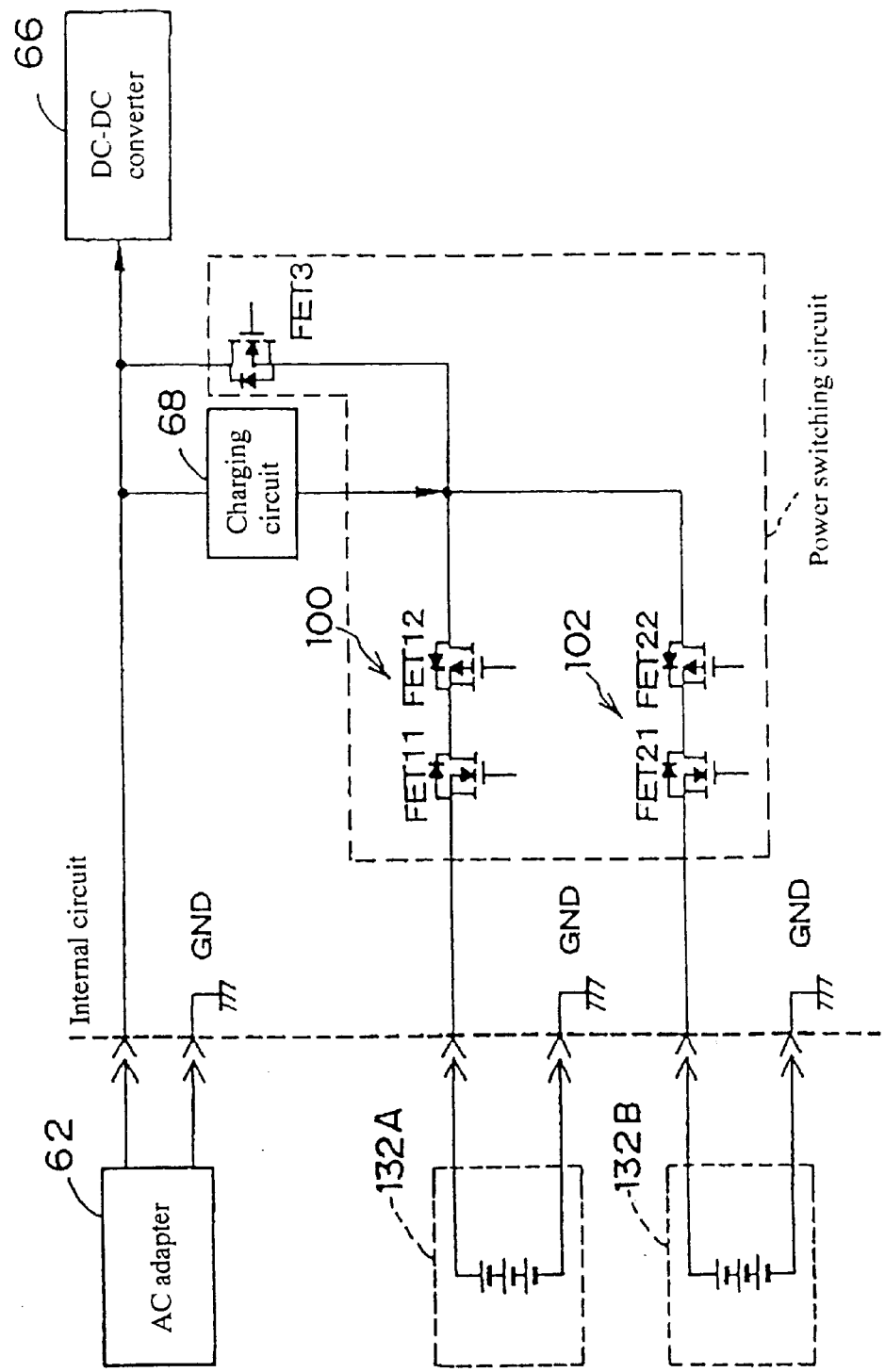

US 6,396,243 B2

POWER UNIT AND POWER SOURCE SWITCHING APPARATUS FOR A COMPUTER

FIELD OF THE INVENTION

The present invention relates generally to a power unit, a power source switching apparatus, and a computer, and more particularly to a power unit provided with a battery enabled to supply a power to an external device, a power source switching apparatus provided with a plurality of batteries and enabled to supply a power to a load, and a computer that employs the power source switching apparatus.

BACKGROUND OF THE INVENTION

In recent years, there have appeared portable personal computers (hereinafter "portable PCs") developed in various sizes and provided with various functions so as to cope with the spread of mobile computing. For example, there are lap-top personal computers, more compact lap-top personal computers, palm-top personal computers and PDA (Personal Data Assistant) devices.

A portable PC generally has a removable battery mounted therein which allows the user to use the portable PC in an environment where no commercial power source is available, for example, in a train. Generally, a secondary battery that can be charged for repetitive use is employed as such a battery described above.

When a commercial power source is available, the user can connect an AC adapter (a device enabled to input a commercial AC voltage and output a DC voltage) to the portable PC. Consequently, the user can charge the secondary battery during operation of the portable PC.

However, because the capacity of one secondary battery is limited, the operating time of the portable PC is also limited. To extend the operating time of the portable PC, therefore, two secondary batteries are often built in the portable PC. Those two secondary batteries are referred to as the main battery and the second battery. A portable PC is started up with the power from the second battery. When the second battery is used up, the second battery is switched to the main battery, so that the portable PC can continue in operation.

Each of such portable PCs, home electric appliances, and other devices that use an AC adapter, a main battery, and a second battery as power sources is provided with a power source switching circuit for setting a charging path of the main or second battery via an AC adapter (hereinafter, referred to as the "charging path"), a discharging path used to supply a power from the main battery to an object computer (hereinafter, referred to as the "discharging path"), and another discharging path, etc. used to supply a power from the second battery to the object computer.

FIGS. 9 through 11 show block diagrams of such conventional power source switching circuits.

The block diagram of FIG. 9 shows a power source switching circuit in which each of the main battery and the second battery is provided with a protective circuit for preventing excessive discharging and excessive charging.

As shown in FIG. 9, this power source switching circuit is provided with a first serial circuit 100 located between a power line L from an AC adapter 62 to a DC-DC converter 66 and a main battery 130A and a second serial circuit 102 located between the power line L and a second battery 130B.

The first serial circuit 100 is provided with field effect transistors (hereinafter, referred to as a "FET") FET1 and FET2. Just like the first serial circuit 100, the second serial circuit 102 is also provided with field effect transistors FET3 and FET4.

In FET1 and FET3 are formed internal diodes D1 and D3 in which the cathode is connected to the drain D and the anode is connected to the source S respectively. In FET2 and FET4 are formed internal diodes D2 and D4 in which the cathode is connected to the source S and the anode is connected to the drain D respectively. Those internal diodes are also sometimes referred to as parasitic diodes or body diodes.

A trickle charging circuit 140A and a trickle charging circuit 140B are provided between the power line L and the source S of FET1 and between the power line L and the source S of FET3 respectively. A quick charging circuit 142 is provided between the power line L and the drain D of FET2. The drains D of both FET2 and FET4 are connected to each other and FET 5 is provided between the junction point of those drains D and the power line L so as to prevent the quick charging circuit 142 from short-circuiting during a quick charging operation.

In the block diagram shown in FIG. 9, both of the main battery 130A and the second battery 130B are first charged by the trickle charging circuit until each battery voltage reaches a certain value, then charged rapidly by the quick charging circuit until they are fully charged. The expression 'trickle charging' means charging at a slow rate so as to avoid damage to the subject battery. The battery capacity is almost zero during such trickle charging and is therefore too low to supply the power required for system operation.

FET5 is off while the quick charging circuit 142 charges the main battery 130A or the second battery 130B. FET5 is turned on when the trickle charging circuit 140A or 140B charges the main battery 130A or the second battery 130B or when either the main battery 130A or the second battery 130B supplies the DC power to the DC-DC converter 66.

Each of the main battery 130A and the second battery 130B is provided with a protective circuit 110A/110B configured by two FETs connected serially. The two FETs (FET6, FET7) in the protective circuit 110A are connected serially to the first serial circuit 100 in the same state of each FET in the first serial circuit. The two FETs (FET8, FET9) in the protective circuit 110B are connected serially to the second serial circuit 102 in the same state of each FET in the second serial circuit 102. Both FET6 and FET8 are used to protect the subject circuit from excessive charging and both FET7 and FET9 are used to protect the subject circuit from excessive discharging.

In the event that the power source switching circuit configured as described above is loaded with the AC adapter 62, the main battery 130A charged fully, and the second battery 130B in the empty state during a system operation, the trickle charging circuit 140B charges the second battery 130B. At this time, FET1 and FET3 are turned off and FET2 and FET4 are turned on. FET5 is also turned on.

Consequently, when the AC adapter 62 is disconnected from the system in that state and the power supply is thereby shut off, the DC-DC converter 66 receives DC power from the main battery 130A via the internal diode D1 in FET1, and also via FET2 and FET5.

An alternative arrangement is shown in FIG. 10. Serial circuits 100 and 102 are identical in configuration to those shown in FIG. 9; the first serial circuit 100 is formed in the power path from the main battery 132A to the DC-DC converter 66 and the second serial circuit 102 is formed in the power path from the second battery 132B to the DC-DC converter 66. However, the configuration in FIG. 10 differs from that shown in FIG. 9 in that the power output line from the charging circuit 68 is branched into two lines wherein one line is connected between the first serial circuit 100 and the main battery 132A via two FETs connected serially so that the cathodes of their internal diodes are connected to each other, and the other line is connected between the second serial circuit 102 and the second battery 132B via two FETs connected serially so that cathodes of their internal diodes are connected to each other. In addition, the block diagram shown in FIG. 10 is also different from the block diagram shown in FIG. 9 in that neither the main battery 132A nor the second battery 132B is provided with a protective circuit and the charging circuit for charging each battery is configured as a single charging circuit 68; it is not divided into a trickle charging circuit and a quick charging circuit. The control terminal (gate) of each FET is connected to a power path control IC 146 so that the IC 146 controls the switching (on/off) operation of each FET. The power path control IC is generally available and it is configured mostly as shown in FIG. 10.

In such a configuration, however, 8 (eight) FETs are required to completely separate the discharging path of each battery from the charging path. Therefore, the manufacturing cost becomes very high.

In order to avoid such an increase in manufacturing cost, an alternative configuration is used as shown in FIG. 11. In this configuration, a charging circuit 68 is provided at the DC-DC converter 66 side of the first and second serial circuits 100 and 102 respectively and the FET for protecting the charging circuit 68 from short-circuiting is provided between a power input terminal and a power output terminal of the charging circuit 68. A controller (not illustrated) controls the switching operation of each FET in this case.

In the configuration of FIG. 11, the AC adapter 62 is not connected to the internal circuit, and FET3, for protecting the charging circuit 68 from short-circuiting, is turned on when the main battery 132A or the second battery 132B supplies the power to the DC-DC converter 66 and FET3 is turned off when a sensor circuit (not illustrated) senses the connection of the AC adapter 62 to the internal circuit. Thereby, the AC adapter 62 is connected to the internal circuit, the AC adapter 62 supplies the power to the DC-DC converter 66 and the charging circuit 68 charges the batteries in each of the main battery 132A and the second battery 132B. While the charging circuit 68 is charging the subject batteries, FET3 protects the charging circuit 68 from short-circuiting between power input and output terminals.

In this configuration, the manufacturing cost is reduced more significantly than the configuration shown in FIG. 10, since a single path of each battery is used commonly as the discharging path and the charging path, thereby reducing the total number of FETs to five.

However, the configuration shown in FIG. 9 has a problem that the power loss of the power path becomes high and the manufacturing cost is increased, since the five FETs (the two FETs being provided in the protective circuit, the two FETs being used to switch between power sources, and one FET being used to protect the quick charging circuit from short-circuiting) are connected serially.

In order to solve this problem, the present inventor has proposed a technique for eliminating two FETs used to switch between the above power sources by making two FETs in the protective circuits function like the power switching FETs. This technique has left the following problems unsolved, however.

1. The technique cannot apply to a battery that is not provided with a protective circuit configured as shown in FIG. 9.

2. In the event that the protective circuit in one of the batteries develops trouble, the protective circuit in the other battery works so as to sometimes blow the temperature fuse (not illustrated). For example, because a large current flows in the main battery via the internal diode due to a short-circuit between batteries while one FET is switched to the other in a protective circuit so as to supply a power from both of the main battery and the second battery, the heat protective function of the main battery works so as to blow the temperature fuse in the main battery. In that case, the main battery develops trouble unfavorably even when there is no trouble actually detected in the main battery.

3. It is impossible while one battery is charged rapidly to provide trickle charging for the other battery. In such a case, the position of the power source switching circuit is not located between the trickle charging circuit and the quick charging circuit. This is why both FETs in the protective circuit in the other battery must be turned off while one battery is charged rapidly, and this disables trickle charging for the other battery.

Because the technique for replacing one power source switching FET with the other FET in a protective circuit gives rise to various problems as described above, the technique is not yet put to practical use.

On the other hand, there is a problem that because the conventional configuration shown in FIG. 11 needs three FETs for the discharging path of each battery, an additional FET is required as compared with the configuration shown in FIG. 10, and accordingly there is a power loss caused by this additional FET in each discharging path.

Under such circumstances, it is an aim of the present invention to provide a power unit, a power source switching unit, and a computer that can reduce power loss, as well as the manufacturing cost.

SUMMARY OF THE INVENTION

The power unit of the present invention is provided with a battery enabled to supply a power to an external device when connected thereto and a switch enabled to control the switching between on and off of the power from the battery to the external device.

Consequently, the switch of the power unit can be used as a power source switch for switching between discharging paths so as to supply a power from a battery to a subject computer. And, because the switch is provided in the power unit, switches can be eliminated from circuitry to which the power unit is connected. The power loss and the manufacturing cost are therefore reduced due to the eliminated switch.

The above switch may be a FET. The battery may be one of a number of different types including lithium-ion batteries, nickel-hydrogen batteries, nickel-cadmium batteries, and the like. And, the power unit of the present invention may further include switch controlling means for controlling switching between power sources with use of the above switch in response to a request from an external device.

A power source switching unit according to the present invention is provided with a plurality of such power units and a power path is provided between each battery provided in each of a plurality of the power units and a load. Each internal switch switches between supply and shut-off of the power so that the switch controlling means switches between the internal switch and the switch so as to prevent a short-circuit between batteries in case batteries for supplying a power to the load respectively are switched.

The number of the internal switches in one power path is determined by subtracting the number of switches enabled to switch between power sources from all the switches required in the power path. However, the minimum number is one.

For example, in case there are two enabled power switches (FET6 and FET7) among the switches (for example, FET6 and FET7 in FIG. 9) located in one power path and there are only two switches (FET1 and FET2) required to switch power sources in the power path as shown in the conventional configuration shown in FIG. 9, the minimum necessary internal switch is just one.

Consequently, because each switch of the power unit is used as a power source switch, the number of internal switches can be reduced according to the number of the switches employed as the power source switch, thereby both power loss and manufacturing cost can be reduced due to the reduced internal switches.

In the event that either the power unit switch or the internal switch in the power source switching unit develops trouble, a large current might possibly flow in the switching unit.

In order to avoid such a trouble, therefore, the switch controlling means should preferably provide control so as to shut off both of the internal switch and the switch when either the internal switch or the switch develops trouble. Consequently, the flow of such a large current can be suppressed, thereby improving the safety of the unit.

When both the power unit switch and the switch in the power source switching unit are field effect transistors (FET), it is possible to dispose the internal switch and the switch with the same power path so that their internal diodes are connected to each other at the same polarity. Consequently, just one switch and just one internal switch are required so as to prevent short-circuiting between batteries.

A computer according to the present invention is provided with such a power source switching unit and the load in the switching unit is a computer load. It is thus possible to reduce the number of internal switches thereby reducing the power loss and the manufacturing cost.

A power source switching unit according to another aspect of the invention is used to supply power to a load from an external power source and a plurality of batteries. The power source switching unit is provided with an external power circuit for enabling the above external power source to supply the power to the load; and a charging circuit enabled to charge at least one of a plurality of the batteries with the power from the external power circuit. The above batteries may be lithium-ion batteries, nickel-hydrogen batteries, nickel-cadmium batteries, or the like.

Furthermore, such a power source switching unit is also provided with a plurality of serial circuits, one of which is provided in each of the power paths from each of the batteries to the load. Each of the serial circuits is configured by two switches connected serially so that diodes disposed in parallel in the switches are connected to each other at the same polarity terminals. Concretely, this serial circuit is configured by two switches connected serially so that the anode or cathode of each diode is connected to that of another diode in them.

Furthermore, this power source switching unit includes a power source switching circuit configured so that a switch in which diodes are disposed in parallel is connected to the junction point between the two switches in the corresponding serial circuit and the diodes in the switch are connected to the diodes in the two switches at the same polarity terminals. The switch is provided in each power path between the charging circuit to each of the batteries.

The power source switching unit configured as described above can use one of the two switches in the serial circuit, which is located at the battery side, commonly for discharging and charging the battery. Consequently, it is possible to reduce the number of power source switching circuits, thereby the manufacturing cost can be reduced more than when the switch is not used commonly.

Furthermore, the power source switching unit configured as described above can use one of the two switches in the serial circuit, which is located at the load side, commonly for discharging the battery and preventing the charging circuit from short-circuiting while charging the battery. It is thus possible to reduce the number of the switches in the discharging path, thereby the power loss in the discharging path can be reduced more than when a dedicated switch is provided in each discharging path so as to prevent the charging circuit from short-circuiting.

A field effect transistor (FET) should preferably be employed as each switch in the power source switching unit. Because internal diodes are usually formed in parallel in a FET, these internal diodes can be disposed in parallel in such a switch, thereby simplifying the configuration of the switch.

BRIEF DESCRIPTION OF THE DRAWINGS

FIG. 1 is a schematic block diagram of a computer system according to an embodiment of the present invention;

FIG. 2 is a perspective external view of a lap-top personal computer (PC);

FIG. 3 is a block and partial circuit diagram of the internal configurations of the main battery and the second battery of the lap-top PC and a portion related to power supply to a DC-DC converter of an internal circuit of the PC according to a first embodiment;

FIG. 4 is a flowchart of a power switching operation by an embedded controller during normal operation of the lap-top PC according to the first embodiment;

FIG. 5 is a flowchart of a power source switching operation by the embedded controller while the operation of the lap-top PC according to the first embodiment is abnormal;

FIG. 6 is a block and partial circuit diagram of the internal configurations of the main battery and the second battery of the lap-top PC and a portion related to power supply to the DC-DC converter of the internal circuit according to the second embodiment;

FIG. 7 is a block and partial circuit diagram of the internal configurations of the main battery and the second battery of the lap-top PC and a portion related to power supply to the DC-DC converter of the internal circuit according to a third embodiment;

FIG. 8 is a flowchart of a power source switching operation by the embedded controller of the lap-top PC according to the third embodiment;

FIG. 9 is a block and partial circuit diagram showing a conventional configuration;

FIG. 10 is a block and partial circuit diagram showing another conventional configuration; and FIG. 11 is a block and partial circuit diagram showing another conventional configuration.

DETAILED DESCRIPTION OF THE INVENTION

Hereunder, the preferred embodiments of the present invention will be described, by way of example only, with reference to the accompanying drawings.

FIG. 1 shows an explanatory view of a hardware block diagram of a computer system 10 configured by a typical personal computer (PC) to which the present invention applies. The computer system 10 is divided into subsystems in FIG. 1. An example of the PC of the present invention is a lap-top PC 12 (see FIG. 2) that conforms to the OADG (PC Open Architecture Developer's Group) specifications and the "Windows98 or NT" (Microsoft Corp., USA) or the "OS/2" (IBM Corp., USA) is installed therein as an operating system (OS). Hereinafter, each component of the computer system 10 will be described.

A CPU 14 that functions as the brain of the whole computer system 10 executes various programs under the control of the OS. The CPU 14 may be any of the "Pentium" that is a CPU chip of Intel Inc. USA, a CPU of another company such as AMD Inc., and the "PowerPC" of IBM Corp., USA.

The CPU 14 is connected to each of the hardware components via a three-layer bus configured by an FS (Front Side) bus 18, which is connected directly to the external pins of the processor (CPU 14) itself; a PCI (Peripheral Component Interconnect) bus 20 used for fast I/O devices; and an ISA (Industry Standard Architecture) bus 22 used for slow I/O devices.

The FS bus 18 and the PCI bus 20 are connected to each other via a CPU bridge (host-PCI bridge) 24 referred to generally as a memory/PCI control chip.

The main memory 16 is a writable memory used as an area in which an execution program of the CPU 14 is read or as a work area in which data processed by the execution program is written.

The execution program mentioned here is, for example, any of such operating systems as Windows98 and the like, various device drivers for operating peripheral devices, application programs dedicated to specific business works, and such firmware programs as the BIOS (Basic Input/Output System: program for controlling the input/output of such hardware devices as a keyboard, a floppy disk drive, etc.) stored in the flash ROM 72.

The PCI bus 20 is of a type enabled to transfer data comparatively fast and the PCI bus 20 is connected to such PCI devices as a card controller 30 driven comparatively fast.

The video subsystem 26 is used to execute video-related functions. The subsystem 26 includes a video controller that actually processes each drawing instruction from the CPU 14, writes the processed drawing information in the video memory (VRAM) once, and reads drawing information from the VRAM so as to display it on a liquid crystal display (LCD) 28 (see FIG. 2) as drawing data.

The PCI bus 20 is connected to a card bus controller 30, an audio subsystem 32, a docking station interface (Dock I/F) 34, and a mini-PCI slot 36 respectively. The card bus controller 30 is used exclusively to connect the bus signal of the PCI bus 20 directly to the interface connector (card bus) of a PCI card bus slot 38. The card bus slot 38 is disposed, for example, on the wall surface of the PC 12 body and enabled to load a PC card 40 conforming to the specifications (ex., "PC Card Standard 95") regulated by PCMCIA (Personal Computer Memory Association)/(JEIDA (Japan Electric Industry Development Association).

The dock I/F 34 is a hardware component used to connect the PC 12 to the docking station (not illustrated). The mini-PCI slot 36 is connected to a network adapter 42 used to connect, for example, the computer system 10 to a network (ex., LAN).

The PCI bus 20 and the ISA bus 22 are connected to each other via an I/O bridge 44. The I/O bridge 44 is provided with a bridging function used between the PCI bus 20 and the ISA bus 22; an IDE (Integrated Drive Electronics) interface function; a USB (Universal Serial Bus) function, etc. The I/O bridge 44 has a real time clock (RTC) built in itself. For example, a device (core chip) referred to as the PIIX4 (Intel, Inc.) can be used as the I/O bridge 44. The IDE interface realized by the IDE interface function is connected to an IDE hard disk drive (HDD) 46 and to the IDE CD-ROM drive 48 via an ATAPI (AT Attachment Packet Interface).

The I/O bridge 44 is provided with a USB port connected to a USB connector 50 provided, for example, on the wall surface of the PC 12 body.

Furthermore, the I/O bridge 44 is connected to an EEPROM 94 via the SM bus. The EEPROM 94 is a non-volatile memory used to hold such information as the password registered by each user, a supervisor password, the serial number of the product, etc. The information in the EEPROM 94 can be rewritten electrically.

The I/O bridge 44 is also connected to an electric power circuit 54. The electric power circuit 54 is provided with such circuits as an AC adapter 62; a battery charger 68 used to charge the main battery 64A or second battery 64B, and a DC/DC converter 66 used to generate such DC constant voltages as 5V, 3.3V, etc. used for the computer system 10.

On the other hand, in the core chip that configures the I/O bridge 44 are provided an internal register used to manage the electric power state of the computer system 10 and a logic (state machine) used to manage the electric power state of the computer system 10 including the operation of the internal registers.

The logic described above exchanges signals with the electric power circuit 54, thereby recognizing the actual supply condition of the electric power to the computer system 10 from the electric power circuit 54. And, according to each command from the logic, the electric power circuit 54 controls the supply of the electric power to the computer system 10.

The ISA bus 22 has a slower data transfer rate than the PCI bus 20. The ISA bus 22 is connected to comparatively slow peripheral devices (not illustrated), such as a flash ROM configured by a super I/O controller 70, an EEPROM, etc.; a CMOS 74; an embedded controller 80 connected to the gate array logic 76; and a keyboard/mouse controller.

The super I/O controller 70 is connected to the I/O port 78. The super I/O controller 70 controls the driving of the floppy disk drive (FDD), the input/output of parallel data via a parallel port, and the input/output of serial data via a serial port.

The flash ROM 72 is a non-volatile memory used to hold such programs as the BIOS, etc. The data stored in this ROM 72 can be rewritten electrically. The CMOS 74 is a non-volatile semiconductor memory connected to a backup electric power source. It functions as fast storage means.

The embedded controller 80 controls the keyboard (not illustrated). The controller 80 also controls the power management controller built therein so as to bear part of the electric power management function in cooperation with the gate array logic 76.

FIG. 3 shows a block diagram of the main battery 64A and the second battery 64B, as well as a portion related to the power supply to the DC-DC converter 66 of the internal circuit 120 (except for the AC adapter 62, the main battery 64A, and the second battery 64B) of the PC 12.

As shown in FIG. 3, the main battery 64A in the first embodiment is configured by a battery 112A configured by three lithium-ion batteries (rated voltage: 4.2V) connected serially; a protective circuit 110A used to prevent the battery 112A from both over-discharging and over-charging; and a thermistor TH1 provided near the protective circuit 110A and used to detect the ambient temperature of the protective circuit 110A. The protective circuit 110A is identical to the protective circuit shown in FIG. 9 and configured by the over-charging protective FET6 and the over-discharging protective FET7 connected serially so that the cathodes of their internal diodes are connected to each other.

The high level terminal of the battery 112A is connected to the source S of the FET6 of the protective circuit 110A and the drain D of the FET7 of the protective circuit 110A is connected to the corresponding plus (+) terminal. And, the gate G of the FET7 of the protective circuit 110A is connected to the corresponding C terminal, so that the switching operation of the FET7 can be controlled by the control signal C12 received from an external source.

The low level terminal of the battery 112A is connected to the corresponding minus (−) terminal, as well as the T terminal via the thermistor TH1.

The second battery 64B is also configured just like the main battery 64A and it includes a battery 112B configured by three lithium-ion batteries (rated voltage: 4.2V) connected serially; a protective circuit 110B used to prevent the battery 112B from both over-discharging and over-charging; and a thermistor TH2 provided near the protective circuit 110B and used to detect the ambient temperature of the protective circuit 110B. The protective circuit 110B is identical to the protective circuit shown in FIG. 9 and it is configured by an over-charging protective FET8 and an over-discharging protective FET9 connected serially so that the cathodes of their internal diodes are connected to each other.

The high level terminal of the battery 112B is connected to the source S of the FET8 of the protective circuit 110B and the drain D of the FET9 of the protective circuit 110B is connected to the corresponding plus (+) terminal. And, the gate G of the FET9 of the protective circuit 110B is connected to the corresponding C terminal, so that the switching operation of the FET9 can be controlled by the control signal C22 received from an external source.

The low level terminal of the battery 112B is connected to the corresponding minus (−) terminal, as well as the T terminal via the thermistor TH2.

In FIG. 3, internal circuit 120 is provided with a power line L between the A1 terminal to which the high level terminal of the AC adapter 62 is connected and an input terminal of the DC-DC converter 66. Consequently, the AC adapter 62, while it is connected to the internal circuit 120, supplies the power to the DC-DC converter 66 via the power line L.

The internal circuit 120 is also provided with FET1 and FET2. FET1 is provided between the plus (+) terminal connected to the main battery 64A and the power line L and FET2 is provided between the plus (+) terminal connected to the second battery 64B and the power line L.

The PC 12 in this embodiment has a battery pack pit (not illustrated). The main battery 64A and the second battery 64B are removably mounted in this pit. The main battery 64A and the second battery 64B, when mounted in the battery pack pit, are connected to the internal circuit 120 via the C terminal, the plus (+) terminal, the T terminal, and the minus (−) terminal respectively.

In both FET1 and FET2, the anode of each internal diode is connected to the plus (+) terminal and the cathode is connected to the power line L. The FET may be a power MOSFET.

A charging circuit 68 is provided between the power line L and the drain D of the FET1. The charging circuit 68 is provided with functions for quick charging and trickle charging. The drains D of both FET1 and FET2 are connected to each other and a FET3 is provided between the junction point and the power line L. FET3 prevents the charging circuit from short-circuiting while the charging circuit 68 charges the main battery 64A or the second battery 64B. Concretely, FET3 is turned off while the charging circuit 68 charges the main battery 64A or the second battery 64B and turned on while the main battery 64A or the second battery 64B supplies a DC power to the DC-DC converter 66. In FET3 are formed internal diodes so that their cathodes are connected to the drain D and their anodes are connected to the source S respectively.

The gate G of each of FET1, FET2, and FET3 is connected to an output terminal of the embedded controller 80 via the corresponding FET driving circuit. The output terminal outputs control signals C11, C21, and C3. Thus, the embedded controller 80 controls the switching operations of FET1, FET2, and FET3 with the corresponding control signal.

The C terminal to which the main battery 64A is connected is connected to an output terminal of the embedded controller 80, which outputs the control signal C12. Thus, the embedded controller 80 controls the switching operation of FET7 of the protective circuit 110A built in the main battery 64A with the control signal C12.

The C terminal to which the second battery 64B is connected is connected to an output terminal of the embedded controller 80, which outputs the control signal C22. Thus, the embedded controller 80 controls the switching operation of FET9 of the protective circuit 110B built in the second battery 64B with the control signal C22.

On the other hand, the T terminal to which the main battery 64A is connected is connected to the embedded controller 80 via a connection line pulled up to DC5V via a resistor R1 and the T terminal to which the second battery 64B is connected is connected to the embedded controller 80 via a connection line pulled up to DC5V via a resistor R2.

While the main battery 64A is not connected to the internal circuit 120, 5V is assumed as the VX at an input terminal of the embedded controller 80. The input terminal is connected to the T terminal. The voltage VX at this time, when it is converted to a temperature detected by the thermistor TH1, becomes an unrealistic temperature as −50° C. On the other hand, while the main battery 64A is connected to the internal circuit 120, the voltage VX takes a value calculated as follows.

$$VX = 5 \times Rth/(R1X + Rth)$$

Here, Rth denotes the resistance value of the thermistor TH1 and R1X denotes the resistance value of the resistor R1. The voltage VX at this time, when it is converted to a temperature, takes such a normal temperature as 30° C. Consequently, the embedded controller 80, which presets a threshold value to, for example, −10° C., determines that the main battery 64A is connected to the internal circuit 120 when the temperature corresponding to the voltage VX is over the threshold value and conversely that the main battery is not connected to the internal circuit 120 when the temperature is under the threshold value.

In the same way, the embedded controller 80 can decide the connection state of the second battery 64B.

The thermistors TH1 and TH2 may be replaced with ordinary resistors. In this case, it can be determined that the battery is not connected to the internal circuit 120 when the voltage VX is 5V and the battery is connected to the internal circuit 120 when the voltage VX is under 5V.

Although not illustrated in FIG. 3, a PTC (Positive Temperature Coefficient) thermistor is provided near each of the FET1 and the FET2. The embedded controller 80 can detect an abrupt change of the temperature around each of the FET1 and the FET2 with use of this thermistor.

An A2 terminal is connected to the low level terminal of the AC adapter 62, a minus (−) terminal is connected to the main battery 64A, and a minus (−) terminal is connected to the second terminal 64B inside the internal circuit 120.

In the embedded controller 80 in this first embodiment, the states of the control signals C11, C12, C21, and C22 are preset as shown in table 1 corresponding to the PC 12 being driven by the AC adapter 62, the main battery 64A, and the second battery 64B in various operation modes.

TABLE 1

| Mode | C11 | C12 | C21 | C22 | Description |
|---|---|---|---|---|---|
| Mode 1 | ON | ON | OFF | OFF | Driven by the main battery |
| Mode 2 | OFF | ON | OFF | OFF | Shift 1 |
| Mode 3 | OFF | ON | OFF | ON | Shift 2 (system off, etc.) |
| Mode 4 | OFF | OFF | OFF | ON | Shift 3 |
| Mode 5 | OFF | OFF | ON | ON | Driven by the second battery |

Each of the mode 2 (shift 1), the mode 3 (shift 2), and the mode 4 (shift 3) in the table 1 is set when the battery is switched between the main battery 64A and the second battery 64B so as to drive the operation. However, the mode 3 is set even when the system is driven by the AC adapter 62 and the system is off.

In addition to those shown in FIGS. 1 and 3, many more electrical circuits are required to configure the computer system 10. However, because those electrical circuits are already known by the people concerned and they are not relevant to an understanding of the present invention, the description for them is omitted from this specification. And, also note that only some of the connections between the hardware blocks in FIGS. 1 and 3 are shown in order to simplify the description.

Next, a description will be made for a switching operation between power sources of the PC 12 in this first embodiment. At first, a normal operation of the PC 12 will be described with reference to FIG. 4. FIG. 4 shows a flowchart of such the power source switching operation of the embedded controller 80 when the operation of the PC 12 is normal. In this case, it is premised that the PC 12 is driven by any of the AC adapter 62, the main battery 64A, and the second battery 64B. In addition, the description of charging operations for those batteries will be omitted. Accordingly, FET3 is kept on by the embedded controller 80.

In step 200 shown in FIG. 4, the embedded controller 80 decides whether to drive the PC 12 with the main battery 64A. In case the decision is NO (not to drive the PC 12 with the main battery 64A), control goes to step 202 so as to decide whether to drive the PC 12 with the second battery 64B. In case the decision is NO (not to drive the PC 12 with the second battery 64B), control goes to step 204 so as to decide whether to drive the PC 12 with the AC adapter 62. In case the decision is YES (to drive the PC 12 with the AC adapter 62), control goes to step 224 so as to set the mode 3 denoted in Table 1. Control then returns to step 200.

The processing in step 224 turns off both FET1 and FET2 and turns on both FET7 in the protective circuit 110A and FET9 in the protective circuit 110B. Thus, the DC-DC converter 66 can receive a power from either the main battery 64A or the second battery 64B even when the AC adapter 62 is disconnected from the PC 12 for any reason.

On the other hand, in case the embedded controller 80 decides in step 204 so as not to drive the PC 12 with the AC adapter 62, it is regarded that the system is to be turned off. Control thus goes to step 222 so as to set the mode 3 denoted in Table 1, then exits this processing. The processing in step 222 turns off both FET1 and FET2 and turns on both FET7 in the protective circuit 110A and FET9 in the protective circuit 110B. The DC-DC converter 66 can thus receive a power from any of the main battery 64A or the second battery 64B even when the system is started up.

The decision in step 200 for whether to drive the PC 12 with the main battery 64A is done as follows; in case the main battery 64A still has a residual capacity enough to supply a power to the DC-DC converter 66 while the AC adapter 62 is not connected to the internal circuit 120, it is decided that the PC 12 is to be driven by the main battery 64A.

The decision in step 202 for whether to drive the PC 12 with the second battery 64B is done as follows; in case the second battery 64B still has a residual capacity enough to supply a power to the DC-DC converter 66 while the AC adapter 62 is not connected to the internal circuit 120, it is decided that the PC 12 is to be driven by the second battery 64B.

The decision in step 204 for whether to drive the PC 12 with the AC adapter 62 is done as follows; in case the AC adapter 62 is connected to the internal circuit 120, it is decided that the PC 12 is to be driven by the AC adapter 62.

In case the decision is YES in step 200 (to drive the PC 12 with the main battery 64A), control goes to step 206 so as to set the mode 1 denoted in Table 1. Thereby, both FET1, as well as FET7 in the protective circuit 110A are turned on and both FET2, as well as FET9 in the protective circuit 110B are turned off. It is thus possible to form a discharging path between the main battery 64A and the DC-DC converter 66 and prevent short-circuiting between the main battery 64A and the second battery 64B. Because short-circuiting between batteries might possibly cause smoking, ignition, etc., it must be prevented in this way.

In the next step 208, the embedded controller 80 decides whether to switch the main battery to the second battery 64B so as to supply a power to the PC 12. In case the decision is YES, control goes to step 210. The decision in step 208 for switching the battery to the second one 64B is done as follows; in case the residual capacity of the main battery 64A reaches a predetermined value (ex., 0 (zero)), the battery is switched to the second one 64B.

In step 210, the embedded controller 80 goes into the mode 2 from the mode 1, then goes into the mode 3. After that, the controller 80 goes into the mode 4, then into the mode 5. Consequently, the switching states of the FETs (FET1, FET7, FET2, and FET9) are shifted in the order of (ON, ON, OFF, OFF)→(OFF, ON, OFF, OFF)→(OFF, ON, OFF, ON)→(OFF, OFF, OFF, ON)→(OFF, OFF, ON, ON) sequentially. At this time, about one millisecond will be enough to shift from one mode to another. Shifting modes sequentially in this way makes it possible to prevent short-circuiting between batteries, as well as prevent an instantaneous shut-off of the power supplied to the DC-DC converter 66. Such an instantaneous shut-off of the power supplied to the DC-DC converter 66 might possibly cause a shut-down of the PC 12, so it must be avoided.

After the processing in step 210, control goes to step 216 (to be described later). On the other hand, in case the embedded controller 80 decides in step 208 so as to power the PC 12 with the second battery 64B (NO), control goes to step 212 so as to decide whether to turn off the power to the system. In case the decision is YES (to turn off the power to the system), control goes to step 222. In case the decision is NO (not to turn off the power to the system), control returns to step 208. The decision in step 212 for whether to turn off the power to the system can be done by checking whether or not the power switch (not illustrated) of the PC 12 is turned off.

In case the decision in step 202 is YES (to power the PC 12 with the second battery 64B), control goes to step 214 so as to set the mode 5 denoted in Table 1. Consequently, the FET1, as well as the FET7 in the protective circuit 110A are turned off and the FET2, as well as the FET9 in the protective circuit 110B are turned on. It is thus possible to form a discharging path from the second battery 64B to the DC-DC converter 66 and prevent short-circuiting between the main battery 64A and the second battery 64B.

In the next step 216, the embedded controller 80 decides whether to power the PC 12 with the main battery 64A. In case the decision is YES (to power the PC 12 with the main battery 64A), control goes to step 218. The decision in step 216 for whether to power the PC 12 with the main battery 64A can be done by checking the residual capacity of the second battery 64B as follows; in case the predetermined residual capacity (ex., 0 (zero)) is reached, the PC 12 is powered by the main battery 64A.

In step 218, the operation mode is shifted from 5 to 4, 3, 2, then 1 sequentially. Consequently, the switching states of the FETs (FET1, FET7, FET2, and FET9) are shifted in the order of (off, off, on, and on)→(off, off, off, and on)→(off, on, off, and on)→(off, on, off, and off)→(on, on, off, and off) sequentially. At this time, about one millisecond will be enough for each mode to be shifted to another. Shifting modes sequentially such way makes it possible to prevent short-circuiting between batteries, as well as to prevent instantaneous break-off of the power supplied to the DC-DC converter 66.

After the processing in step 218, control returns to step 208.

On the other hand, in case the decision in step 216 is NO (not to power the PC 12 with the main battery 64A), control goes to step 220 so as to decide whether or not the system is to be turned off. In case the decision is YES (the system is to be turned off), control goes to step 222. In case the decision is NO (the system is not to be turned off), control returns to step 216.

Next, a description will be made, with reference to FIG. 5, for a power source switching operation of the embedded controller 80 when the operation of the system is abnormal, FIG. 5 shows a flowchart of the power source switching operation by the embedded controller 80 when the system operation is abnormal.

In step 250 shown in FIG. 5, the embedded controller 80 obtains the temperature T1 detected by the thermistor TH1 and the temperature T2 detected by the thermistor TH2. In step 252, the embedded controller 80 then decides whether or not the temperature T1 is over the predetermined value TX. In case the T1 is over the TX (YES), control goes to step 262. In case the T1 is not over the TX (NO), control goes to step 254 so as to decide whether or not the temperature T2 is over the predetermined temperature TX. In case the T2 is over the TX (YES), control goes to step 262. In case the T2 is not over the TX (NO), control goes to step 256. In this case, the predetermined temperature TX may be any value that can regard that any of FET1, FET2, FET7, and FET9 develops trouble due to short-circuiting, thereby it can be decided that a short-circuit occurs between batteries in case the TX is under the T1 or T2.

In step 256, the embedded controller 80 obtains the temperature PT1 around the FET1 and PT2 around the FET2 detected by the PTC thermistor (not illustrated) respectively. In next step 258, the embedded controller 80 then decides whether or not the PT1 is higher than the predetermined temperature PX. In case the PT1 is higher than the PX (YES), control goes to step 262. In case the PT1 is not higher than the PX (NO), control goes to step 260 so as to decide whether or not the temperature PT2 is higher than the predetermined temperature PX. In case the PT2 is higher than the PX (YES), control goes to step 262. In case the PT2 is not higher than the PX (NO), control returns to step 250. The predetermined temperature PX may be any value that can decide any of FET1, FET2, FET7, and FET9 develops trouble due to a short-circuit occurred therein, thereby it can be decided that a short-circuit occurs between batteries in case the PX is lower than the PT1 or PT2.

In step 262, the embedded controller 80 turns off all of the control signals C11, C12, C21, and C22, thereby all of the FETs (FET1, FET7, FET2, and FET9) are turned off.

Concretely, because one of the FETs (FET1, FET7, FET2, and FET9) is short-circuited when the processing in step 262 is executed, all the above FETs are turned off, thereby the PC 12 can stop a large current flow and improve the safety thereof.

As described above in detail, because the PC 12 in this first embodiment uses a FET provided as a protective circuit in each of the main battery and the second battery in order to switch power sources, it is possible to reduce the number of FETs that should be provided in the internal circuit and thereby reduce both power loss and the manufacturing cost of the PC 12.

Furthermore, because the PC 12 in this first embodiment controls the shut-off of all the power source switching FETs in case any one of the power source switching FETs in the internal circuit, the main battery, and the second battery, the PC 12 can stop a large current flow and improve the safety.

While the embedded controller 80 of the PC 12 directly controls the switching operation of the FET provided in each of the protective circuits in the main and second batteries in the above first embodiment, a description will now be made of a second embodiment for the indirect controlling of the switching operation of the FET in each protective circuit via such a controller as a CPU provided in each of the main and second batteries.

FIG. 6 shows a block diagram of the internal configurations of the main battery 64A' and the second battery 64B' and a portion for supplying power to the DC-DC converter 66 of the internal circuit 120 (i.e. excluding the AC adapter 62, the main battery 64A', and the second battery 64B') in the PC 12 in the second embodiment.

As shown in FIG. 6, the main battery 64A' in this second embodiment differs from the main battery 64A in the first embodiment in that the battery 64A' is provided with a CPU 114A connected to a memory 116A and an output terminal of the CPU 114A is connected to the gate G of the FET7 (see FIG. 9) provided for the protective circuit 110A and an input terminal of the CPU 114A is connected to the corresponding C terminal.

In the same way, the second battery 64B' in the second embodiment also differs from the second battery 64B in the first embodiment in that the battery 64B' is provided with a CPU 114B connected to a memory 116B and an output terminal of the CPU 114B is connected to the gate G of the FET9 provided for the protective circuit 110B and an input terminal of the CPU 114B is connected to the corresponding C terminal.

The configurations of the components other than the main and second batteries are identical to those in the first embodiment.

In this embodiment the CPU 114A/114B functions as the power source switch controlling means of the present invention.

The main battery 64A' sets the switching state for the FET7 in the protective circuit 110A according to the control signal C12 entered from the embedded controller 80 via the corresponding C terminal. In the same way, the second battery 64B' sets the switching state for the FET9 in the protective circuit 110B according to the control signal C22 entered from the embedded controller 80 via the corresponding C terminal. The embedded controller 80 works just like in the first embodiment and therefore, the PC 12 in this second embodiment can function just like in the first embodiment, thereby obtaining the same effect as that of the first embodiment.

And, while the embedded controller 80 obtains a temperature detected by a thermistor directly in the second embodiment, the present invention is not limited only to the method; the embedded controller 80 may obtain the temperature via the CPU built in the subject battery.

And, while the FETs provided in the protective circuits are used as power source switching FETs when the cathodes of their internal diodes are connected to the battery side (FET7 and FET9 in FIG. 9) and the power source switching FETs in the conventional configuration shown in FIG. 9 are deleted in case the cathodes of their internal diodes are connected to the battery side (FET2 and FET4 in FIG. 9) in each of the above embodiments, the present invention is not limited only to the method; the FETs in the protective circuits may be used as power source switching FETs in case the anodes of their internal diodes are connected to the battery side (FET6 and FET8 in FIG. 9) and the power source switching FETs in the conventional configuration may be deleted in case the anodes of their internal diodes are connected to the battery side (FET1 and FET3 in FIG. 9). Also in this case, the effect is the same as that of each embodiment.

Furthermore, while both internal switch and battery switch of the present invention are configured as FETs in each of the above embodiment; the FETs may be replaced with relay switches in which diodes are connected in parallel respectively. Also in this case, the effect is the same as that of each of the embodiments.

While the FETs provided in the protective circuit in each battery are used to switch power sources, thereby reducing both power loss and manufacturing cost in the first and second embodiments, a third embodiment enables the manufacturing cost to be reduced more than that of the configuration with respect to the conventional technique shown in FIG. 10 and the power loss to be reduced more than the configuration with respect to the conventional technique shown in FIG. 11.

FIG. 7 shows a block diagram of internal configurations of the main battery 64A and the second battery 64B and a portion for supplying a power to the DC-DC converter 66 of the internal circuit 120 in the PC 12 in the third embodiment.

As shown in FIG. 7, the main battery 64A in this third embodiment is configured by a battery 112A configured by three lithium-ion batteries (rated voltage: 4.2V). The high level terminal of the battery 112A is connected to the corresponding plus (+) terminal and the low level terminal thereof is connected to the corresponding minus (–) terminal.

Just like the main battery 64A, the second battery 64B is also configured by a battery 112B configured by three lithium-ion batteries (rated voltage: 4.2V). The high level terminal of the battery 112B is connected to the corresponding plus (+) terminal and the low level terminal thereof is connected to the corresponding minus (–) terminal.

On the other hand, the internal circuit 120 of the PC 12 is provided with a first serial circuit 122A located between a power line L from the AC adapter 62 to the DC-DC converter 66 and the main battery 64A; and a second serial circuit 122B located between the power line L from the AC adapter 62 to the DC-DC converter 66 and the main battery 64B.

The first serial circuit 122A is provided with FET11 and FET12. Just like the first serial circuit 122A, the second serial circuit 122B is also provided with two FETs; FET21 and FET22.

In both FET11 and FET21 are formed internal diodes D11 and D21 in which the cathode is connected to the source S and the anode is connected to the drain D respectively. In both FET12 and FET22 are formed internal diodes D12 and D22 in which the cathode is connected to the drain D and the anode is connected to the source S respectively.

The FET11 and the FET12 are configured so that the anodes of the internal diodes D11 and D12 are connected to each other and the cathode of the internal diode D11 is connected to a plus (+) terminal corresponding to the main battery 64A and the cathode of the internal diode D12 is connected to the power line L respectively. In the same way, the FET21 and the FET22 are configured so that the anodes of the internal diodes D21 and D22 are connected to each other and the cathode of the internal diode D21 is connected to a plus (+) terminal corresponding to the second battery 64B and the cathode of the internal diode D22 is connected to the power line L respectively.

On the other hand, the internal circuit 120 in this third embodiment is provided with a charging circuit 68. The input terminal of this charging circuit 68 is connected to the power line L and the output terminal thereof is branched into two lines. One of the branched lines is connected to the junction point between the FET11 and the FET12 of the first serial circuit 122A via the FET13 and the other line is connected to the junction point between the FET21 and the FET22 of the second serial circuit 122B via the FET23.

In both FET13 and FET23 are formed internal diodes D13 and D23 in which the cathode is connected to the drain D and the anode is connected to the source S respectively. In both FET13 and FET23 are respectively formed the drain D in which the drain D is located at the charging circuit 68 side.

The gates G of the FETs (FET11, FET12, FET13, FET21, FET22, and FET23) are connected to different output terminals of the embedded controller 80, so that the switching operation of each FET is controlled independently of others by a control signal from the embedded controller 80.

The low level terminal of the AC adapter 62 is connected to the A2 terminal, the main battery 64A is connected to the minus (−) terminal, and the second battery 64B is connected to the minus (−) terminal respectively in the internal circuit 120.

In the embedded controller 80 in this third embodiment, the state of each FET in each operation mode is preset as shown in Table 2 when the PC 12 is powered by the AC adapter 62, the main battery 64A, and the second battery 64B respectively.

TABLE 2

| Mode | FET11 | FET12 | FET13 | FET21 | FET22 | FET23 | Description |
|---|---|---|---|---|---|---|---|
| Mode A | ON | ON | OFF | OFF | OFF | OFF | Driven by the main battery |
| Mode B | OFF | OFF | OFF | ON | ON | OFF | Driven by the second battery |
| Mode C | On | OFF | OFF | ON | OFF | OFF | Not charged yet |
| Mode D | On | OFF | ON | OFF | OFF | OFF | Charging the main battery |
| Mode E | OFF | OFF | OFF | ON | OFF | ON | Charging the second battery |

The modes C, D, and E denoted in Table 2 are set when the PC 12 is powered by the AC adapter 62 and when the system is off.

In this embodiment, the AC adapter 62 functions as the external power circuit of the present invention, the charging circuit 68 functions as the charging circuit, the first serial circuit 122A/the second serial circuit 122B functions as the serial circuit and the FET13/FET23 functions as the switching circuit of the present invention.

Next, a description will be made for a power source switching operation by the embedded controller 80 in the PC 12 with reference to FIG. 8. FIG. 8 shows a flowchart of the power source switching operation.

In step 300 shown in FIG. 8, the embedded controller 80 decides whether to drive the PC 12 with the main battery 64A. In case the decision is NO (not to drive the PC 12 with the main battery 64A), control goes to step 302 so as to decide whether to drive the PC 12 with the second battery 64B. In case the decision is NO (not to drive the PC 12 with the second battery 64B), control goes to step 304 so as to decide whether to drive the PC 12 with the AC adapter 62. In case the decision is NO (not to drive the PC 12 with the AC adapter 62), control goes to step 320.

The decision in step 300 for whether to drive the PC 12 with the main battery 64A is done as follows; in case the AC adapter 62 is not connected to the internal circuit 120 and the main battery 64A still has a residual capacity enough to supply the power to the DC-DC converter 66, the embedded controller 80 decides so as to power the PC 12 with the main battery 64A.

The decision in step 302 for whether to drive the PC 12 with the second battery 64B is done as follows; in case the AC adapter 62 is not connected to the internal circuit 120 and the second battery 64B still has a residual capacity enough to supply the power to the DC-DC converter 66, the embedded controller 80 decides so as to power the PC 12 with the second battery 64B.

The decision in step 304 for whether to drive the PC 12 with the AC adapter 62 is done as follows; in case the AC adapter 62 is connected to the internal circuit 120 and the power switch (not illustrated) is on, the embedded controller 80 decides so as to power the PC 12 with the AC adapter 62.

In case the decision in step 300 is YES (to drive the PC 12 with the main battery 64A), control goes to step 306 so as to set the mode A denoted in Table 2. Control then returns to step 300. Thus, the processing in step 306 turns on both FET11 and FET12 and turns off all the remaining FETs, thereby a discharging path is formed from the main battery 64A to the DC-DC converter 66 so as to prevent a short-circuit between the main battery 64A and the second battery 64B.

In case the decision in step 302 is YES (to drive the PC 12 with the second battery 64B), control goes to step 308 so as to set the mode B denoted in Table 2. Control then returns to step 300. Thus, the processing in step 308 turns on both FET21 and FET22 and turns off all the remaining FETs, thereby a discharging path is formed from the second battery 64B to the DC-DC converter 66 so as to prevent a short-circuit between the main battery 64A and the second battery 64B.

In case the decision in step 304 is YES (to drive the PC 12 with the AC adapter 62), control goes to step 310 so as to decide whether to charge the main battery 64A. In case the decision is YES (to charge the main battery 64A), control goes to step 312 so as to set the mode D denoted in Table 2. Control then returns to step 300. Thus, both FET11 and FET13 are turned on and the rest FETs are all turned off, thereby a charging path is formed from the charging circuit 68 to the main battery 64A. It is thus possible to prevent short-circuiting between the input and output terminals of the charging circuit 68, as well as short-circuiting between the main battery 64A and the second battery 64B respectively. The decision in step 310 for whether to charge the main battery 64A is done as follows; in case the residual capacity of the main battery 64A is under a predetermined value (ex., 90% of the fully charged capacity), it is decided that the main battery 64A should be charged.

On the other hand, in case it is decided in step 310 that the main battery 64A is not to be charged (NO), control goes to step 314 so as to decide whether to charge the second battery 64B. In case the decision is YES (to charge the second battery 64B), control goes to step 316 so as to set the mode E denoted in Table 2. Control then returns to step 300. The processing in step 316 turns on both FET21 and FET23 and turns off all the rest FETs, thereby a charging path is formed from the charging circuit 68 to the second battery 64B. And, this makes it possible to prevent short-circuiting between the input and output terminals of the charging circuit 68, as well as between the main battery 64A and the second battery 64B. The decision in step 314 for whether to charge the second battery 64B is done as follows; in case the residual capacity of the second battery 64B is under a predetermined value (ex., 90% of the fully charged capacity), it is decided that the second battery 64B should be charged.

In case the decision in step 314 is NO (not to charge the second battery 64B), control goes to step 318 so as to set the mode C. Control then returns to step 300. The processing in step 318 thus turns on both FET11 and FET21 and turns off all the rest FETs. Consequently, the path between the charging circuit 68 and the main battery 64A/the second battery 64B is shut off completely.

On the other hand, in step 320, the embedded controller 80 decides whether to charge the main battery 64A. In case the decision is YES (to charge the main battery 64A), control goes to step 322 so as to set the mode D. Control then returns to step 300. Consequently, just like the processing in step 312, a charging path is formed between the charging circuit 68 and the main battery 64A and this makes it possible to prevent short-circuiting between the input and output terminals of the charging circuit 68, as well as between the main battery 64A and the second battery 64B.

In case the decision is NO (not to charge the main battery 64A) in step 320, control goes to step 324 so as to decide whether to charge the second battery 64B. In case the decision is YES (to charge the second battery 64B), control goes to step 326 so as to set the mode E. Control then returns to step 300. Consequently, just like the processing in step 316, a charging path is formed between the charging circuit 68 and the second battery 64B and this makes it possible to prevent short-circuiting between the input and output terminals of the charging circuit 68, as well as between the main battery 64A and the second battery 64B.

Furthermore, in case the decision is NO (not to charge the second battery) in step 324, control goes to step 328 so as to set the mode C. Control then returns to step 300. Consequently, the path between the charging circuit 68 and the main battery 64A/the second battery 64B is shut off completely just like the processing in step 318.

As described above, the discharging path between the main battery 64A and the PC 12 is configured by two FETs (FET11 and FET12) and the discharging path between the second battery 64B and the PC 12 is configured by two FETs (FET21 and FET22).

Furthermore, the charging path between the charging circuit 68 and the main battery 64A is configured by two FETs (FET13 and FET11) and the charging path between the charging circuit 68 and the second battery 64B is configured by two FETs (FET23 and FET21).

As described above in detail, the PC 12 in this third embodiment enables one of the two FETs, which is located at the battery side, to be used commonly for discharging and charging the battery. Those two FETs are of the first and second serial circuits. Consequently, the third embodiment can reduce the number of FETs and the manufacturing cost of the PC 12 more than when the FET is not used commonly.

Furthermore, the PC in this third embodiment enables one of two FETs, which is located at the load side, to be used commonly for discharging the battery and preventing the charging circuit from short-circuiting during the charging. The two FETs are of each of the first and second serial circuits. Consequently, the third embodiment can reduce the number of FETs and the power loss of the discharging path more than when a dedicated FET is provided in the discharging path so as to prevent the charging circuit from short-circuiting.

While the FET3 used in the conventional configuration shown in FIG. 11 is replaced with two FETs (FET13 and FET23) in this third embodiment, although additional one FET is required as compared with the conventional configuration shown in FIG. 1, the FET3 employed in the conventional technique is connected to a discharging path, thereby a current of about 7 A must be flown in the FET3. However, because it is only required to flow a charging current of about 3 A in both FET13 and FET23, lower-ranked FETs can be used. Thus, there is almost no difference in the manufacturing cost between the conventional technique and this third embodiment.

Next, the power loss to be reduced in each of the above embodiments will be calculated. In case it is assumed that the minimum voltage Vbatt of the subject battery is 9.0V, the power consumption P of the PC body at that time is 45 W, and the on resistance Ron of an FET that is reduced is 20 mΩ, the current Imax that flows in the power line of the battery is calculated as follows.

$$I\text{max}=P/V\text{batt}=45\text{ W}/9\text{V}=5\text{ A}$$

The power Psave that can be reduced according to the number of reduced FETs is thus calculated as follows.

$$P\text{save}=I\text{max}\times I\text{max}\times R\text{on}=5\text{ A}\times5\text{ A}\times0.02\Omega=0.5\text{ W}$$

Consequently, the present invention can reduce a power of about 0.5 W in maximum.

While two FETs that configure both discharging and charging paths are configured so that the anodes of their internal diodes are connected to each other in the third embodiment, the present invention is not limited only to the configuration; the cathodes of their internal diodes may be connected to each other. Also in this case, the effect is the same as that of the third embodiment.

Furthermore, while each switch of the present invention is configured by an FET in this third embodiment, the present invention is not limited only to the method; for example, the switch may be a relay switch in which diodes are connected to each other in parallel, or the like. Also in this case, the effect is the same as that of the third embodiment.

Furthermore, while the embedded controller 80 controls the switching of each FET in each of the above embodiments, the present invention is not limited only to the method; it is also possible to provide a circuit that switches FET switching states according to a sensing result and enable the switching circuit to control the switching of each FET. For example, for the power source switching operation of the embedded controller 80 when the system operation is abnormal in the first embodiment, it is possible to turn off each FET forcibly with use of only a circuit that employs a thermistor and/or a PTC so as to detect that a predetermined temperature is reached.

Furthermore, while the present invention employs two batteries (main and second batteries) as secondary batteries in each of the above embodiments, the present invention is not limited only to the method; the present invention enables three or more batteries to be used as secondary batteries. Also in this case, the effect is the same as that in each of the above embodiments.

According to the power unit of the present invention as described above, it is possible to use a switch of the power unit for switching discharging paths while a power is supplied from a battery to an external device. Consequently, the number of power source switches that should be provided outside can be reduced, thereby both power loss and manufacturing cost of the power unit can be reduced according to the number of reduced switches. This is an excellent effect of the power unit.

Furthermore, according to the power source switching unit shown in FIGS. 3 and 6, because it is possible to use the switch of the power unit so as to switch power sources, the number of internal switches can be reduced according to the number of switches used for the power unit, thereby both power loss and manufacturing cost of the power source switching unit can be reduced according to the number of reduced internal switches. This is an excellent effect of the power source switching unit. The power loss and manufacturing cost of the computer incorporating such a power source switching unit can be reduced according to the number of reduced internal switches. This is an excellent effect of the computer.

Furthermore, according to the power source switching unit as shown in FIG. 7, because it is possible to use one of the two switches disposed in each of serial circuits, which is located at the battery side, for discharging and charging the battery commonly, the number of power source switching circuits can be reduced more than when the switch is not used commonly. The manufacturing cost of the power source switching unit can thus be reduced. In addition, because it is possible to use one of the two switches disposed in each of serial circuits, which is located at the load side, for discharging the battery and preventing the charging circuit from short-circuiting during the charging, the number of switches in a discharging path can be reduced more than when dedicated switches are provided in the discharging path so as to prevent the charging circuit from short-circuiting, thereby the power loss of the discharging path can be reduced. This is another excellent effect of the power source switching unit.

What is claimed is:

1. A power unit, including:
    a battery enabled to supply power to an external device when connected thereto;
    a switch enabled to control switching between supply and shut-off of said power to said external device; and
    a switch controller means for controlling said switch in response to a signal from said external device.

2. The power unit according to claim 1, wherein said switch is a field effect transistor (FET).

3. The power unit according to claim 1, further including a protection circuit comprising a pair of FETs, wherein one of said pair of FETs functions as said switch in response to said signal from said external device.

4. A power source switching apparatus including:
    a plurality of power units, each power unit including a battery enabled to supply power to a load, and a switch enabled to switch between supply and shut-off of said power to said load, said power source switching apparatus further including:
    a switch controller operable to selectively signal each of said power units to actuate said switch.

5. The power source switching apparatus according to claim 4, further including:
    a plurality of internal switches enabled to switch between supply and shut-off of said power; said switch controller being operable to control switching between an internal switch and said power unit switch so as to prevent a short-circuit between the batteries of said power units whilst changing the battery that supplies said power to said load.

6. The power source switching apparatus according to claim 5;
    wherein said switch controller is operable to shut off both of said internal switch and said power unit switch in case of problems with either said internal switch or said power unit switch.

7. The power source switching apparatus according to claim 5, wherein said internal switches and said power unit switches are field effect transistors (FET) disposed in the same power path so that internal diodes in the switches are connected to each other at the same polarity.

8. A computer including:
    a load;
    a plurality of power units, each including:
        a battery enabled to supply power to said load; and
        a switch enabled to switch between supply and shut-of of said power to said load; the computer further including:
    a switch controller operable to selectively signal each of said power units to actuate said switch.

9. The computer according to claim 8, further including a protection circuit in each of said plurality of power units, each protection circuit comprising a pair of FETs, one of said pair of FETs being arranged to function as said switch in response to signals from said switch controller.

10. A power source switching apparatus for selectively supplying power to a load from an external power source and a plurality of batteries, comprising:
    an external power circuit for supplying power received from said external power source to said load;
    a charging circuit for charging at least one of said plurality of batteries with the power received from said external power circuit;
    a plurality of serial circuits, each being provided in a power path between each of said plurality of batteries and said load and being configured by two switches connected serially, each of said two switches being configured so that diodes disposed in parallel in the switches are connected to each other at the same polarity terminal respectively; and
    a switching circuit provided in each charge path between said charging circuit and each of said plurality of batteries and configured so that a switch in said charge path is connected to a junction point between said two switches in a corresponding serial circuit and diodes disposed in parallel in said charge path switch are connected to said diodes in said two switches at the same polarity terminal respectively.

11. The power source switching apparatus according to claim 10;
    wherein both of said two switches in each power path and said switch in each charge path are field effect transistors (FET).

12. A computer including:
    a load;
    a plurality of batteries;
    an external power circuit for supplying power received from said external power source to said load;
    a charging circuit for charging at least one of said plurality of batteries with the power received from said external power circuit;
    a plurality of serial circuits, each being provided in a power path between each of said plurality of batteries and said load and being configured by two switches connected serially, each of said two switches being configured so that diodes disposed in parallel in the switches are connected to each other at the same polarity terminal respectively; and
    a switching circuit provided in each charge path between said charging circuit and each of said plurality of batteries and configured so that a switch in said charge path is connected to a junction point between said two switches in a corresponding serial circuit and diodes disposed in parallel in said charge path switch are connected to said diodes in said two switches at the same polarity terminal respectively.

* * * * *